United States Patent
Fedyk et al.

(10) Patent No.: US 7,900,250 B1
(45) Date of Patent: Mar. 1, 2011

(54) METHOD OF PROVIDING SECURE GROUPS USING A COMBINATION OF GROUP AND PAIR-WISE KEYING

(75) Inventors: Donald Fedyk, Groton, MA (US); Marcus Leech, Ontario (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1156 days.

(21) Appl. No.: 11/552,230

(22) Filed: Oct. 24, 2006

Related U.S. Application Data

(63) Continuation-in-part of application No. 10/661,903, filed on Sep. 12, 2003, now Pat. No. 7,526,658, and a continuation-in-part of application No. 10/661,734, filed on Sep. 12, 2003.

(60) Provisional application No. 60/729,512, filed on Oct. 24, 2005.

(51) Int. Cl.
*G06F 15/16* (2006.01)
*H04L 9/34* (2006.01)
*G06F 17/00* (2006.01)

(52) U.S. Cl. ........................ 726/15; 713/171; 380/30

(58) Field of Classification Search ............... 380/30; 726/15; 713/171
See application file for complete search history.

(56) References Cited

U.S. PATENT DOCUMENTS

| | | | | |
|---|---|---|---|---|
| 5,668,877 | A * | 9/1997 | Aziz | 380/30 |
| 6,711,264 | B1 * | 3/2004 | Matsumoto et al. | 380/283 |
| 7,096,356 | B1 * | 8/2006 | Chen et al. | 713/163 |
| 7,234,063 | B1 * | 6/2007 | Baugher et al. | 713/189 |
| 7,466,655 | B1 * | 12/2008 | Zhao | 370/238 |
| 7,561,694 | B1 * | 7/2009 | Chakrabarti et al. | 380/270 |
| 2003/0044020 | A1 * | 3/2003 | Aboba et al. | 380/278 |
| 2003/0200454 | A1 * | 10/2003 | Foster et al. | 713/200 |
| 2003/0214966 | A1 * | 11/2003 | Taylor | 370/432 |
| 2004/0120526 | A1 * | 6/2004 | Hamberg | 380/277 |

OTHER PUBLICATIONS

Baugher, M. et al. "The Group Domain of Interpretation" (RFC 3547), Jul. 2003.*
Kent, S. et al. "Security Architecture for the Internet Protocol" (RFC 2401), Nov. 1998.*

* cited by examiner

*Primary Examiner* — Michael J Simitoski
(74) *Attorney, Agent, or Firm* — Anderson Gorecki & Manaras LLP

(57) ABSTRACT

A key selection process is provided which secures traffic between VPN end-points using a combination of SVPN group keys and pair-wise keys. The type of key used is based on the dynamic needs of traffic between the end-points, where the needs may include throughput and quality of service. SVPN group keys allow end-points in a group to initiate data communications while obtaining pair-wise keys in the background. Once pair wise keys are obtained, communications can be transferred using the obtained keys. As the throughput, quality of service, routing and other needs of the channel change, the type of keys used for data transfer may concomitantly change between SVPN group keys and pair-wise keys to appropriately utilize network resources. The key selection idea may be extended to allow communication through a hub using a group key while establishing pair-wise channels for group member communications in the background.

8 Claims, 5 Drawing Sheets

METHOD OF PROVIDING SECURE GROUPS USING A COMBINATION OF GROUP AND PAIR-WISE KEYING

RELATED APPLICATIONS

This application claims priority under 35 U.S.C. §119(e) to provisional patent application Ser. No. 60/729,512 filed Oct. 24, 2005 and incorporated herein by reference. This application is a continuation in part and claims priority under 35 U.S.C. §120 to U.S. patent application Ser. Nos. 10/661,903 and 10/661,734 both filed on Sep. 12, 2003 and incorporated herein by reference.

FIELD OF THE INVENTION

This invention relates generally to the field of networking and more particularly to a mechanism for securing communications between network devices.

BACKGROUND OF THE INVENTION

A virtual private network (VPN) is a private data network that makes use of the public telecommunication infrastructure, or 'backbone,' maintaining privacy through the use of a tunneling protocol and security procedures. The idea of the VPN is to give the consumer private network capabilities at much lower cost by using the shared public infrastructure.

To implement a VPN, each member of a VPN stores forwarding and authentication information that enables communication with other members of the VPN. The VPN may be secured through the use of encryption keys, which may be stored for point to point connections. The forwarding and key tables can get quite large as the network grows and point to point connections associated with each network device are recorded and secured. Network scalability is therefore an issue in VPN network design.

U.S. patent Ser. No. 10/661,903 describes a mechanism for providing a Secure VPN (SVPN) over a shared backbone without the scalability issues of typical VPNs. Each member that is to be a part of a private network registers with a key server. A trusted ingress point is identified, where the ingress point is an edge device through which members of the private network can gain access to the backbone. A trusted egress point is also identified, where the egress point is an edge device through which members of the private network can gain access to the backbone. A group security association associated with the private network is forwarded to the ingress point and egress point, where the group security association may include an encryption key. When a member of the private network seeks to communicate with another member over the backbone, it forwards the communication to the trusted ingress point. The trusted ingress point uses the security association to transform the communication prior to exposing the communication to the backbone. The transformed communication is forwarded over the backbone to the trusted egress point, which decodes the communication using the security association. Such an arrangement provides a scalable solution for securing VPN communications over the backbone, since the number of security associations are related to the number of private networks, as opposed to the number of private network connections.

U.S. patent Ser. No. 10/661,734 describes a system whereby group security information may be used to secure routing information that is forwarded to devices by a route reflector. A route reflector is a device in a network that operates using the Border Gateway Protocol (BGP). BGP is an Internet protocol that enables groups of routers (called autonomous systems) to share routing information so that efficient, loop-free routes can be established. A BGP route reflector is a centralized device that reflects BGP routing information to each member of a group, thereby removing a need for full mesh connectivity between the clients while achieving the BGP goal of route distribution. U.S. patent Ser. No. 10/661,734 describes securing the routing information using group security associations to further secure the VPN. Group members who discover each other may initiate secure VPN communications through the infrastructure using the group security association, with VPN communications being transformed at the ingress and egress nodes.

SUMMARY OF THE INVENTION

According to one aspect of the invention, a key distribution process is provided which secures traffic between VPN endpoints using a combination of SVPN group keys and pair-wise keys. The type of key used is based on the dynamic needs of traffic between the end-points, where the needs may include throughput and quality of service. SVPN group keys allow end-points in a group to initiate data communications while obtaining pair-wise keys in the background. Once pair wise keys are obtained, communications can be transferred using the obtained keys. Switching to a private key protects the group key from being used ubiquitously which lowers its cryptographic strength and or requires more rapid re-keying. Since a secure VPN may be very large the potential for over-using the key is high. Pair wise keys are compute intensive to set up between all sources and can substantially delay the operations (distribution of routing etc) in large VPN. The combination of group keys for fast startup and distribution of routing and other broadcast information and the addition of pair-wise keys for substantial peer to peer traffic is the best compromise.

According to one aspect of the invention, a method of communicating with a group member includes the steps of receiving a group key, discovering a group member and communicating with the group member using the group key over a group channel. Responsive to a trigger condition, a pair-wise key is obtained for communicating with the group member while communicating with the group member on the group channel and communications with the group member are transitioned to a pair-wise channel secured using the pair-wise key.

According to another aspect of the invention, a network device comprising a computer readable medium having program code thereon is provided, where the program code is operable when executed to communicate with a group peer using a group key, monitor traffic conditions on a group channel between the network device and the group member, the group channel being secured by the group key to detect a trigger condition, request a pair-wise key for communicating with the group member; and transition communications with the group member from the group channel to a pair-wise channel secured by the pair-wise key.

These and other aspects of the invention will be described with regard to the below figures.

DETAILED DESCRIPTION

Figure 1:
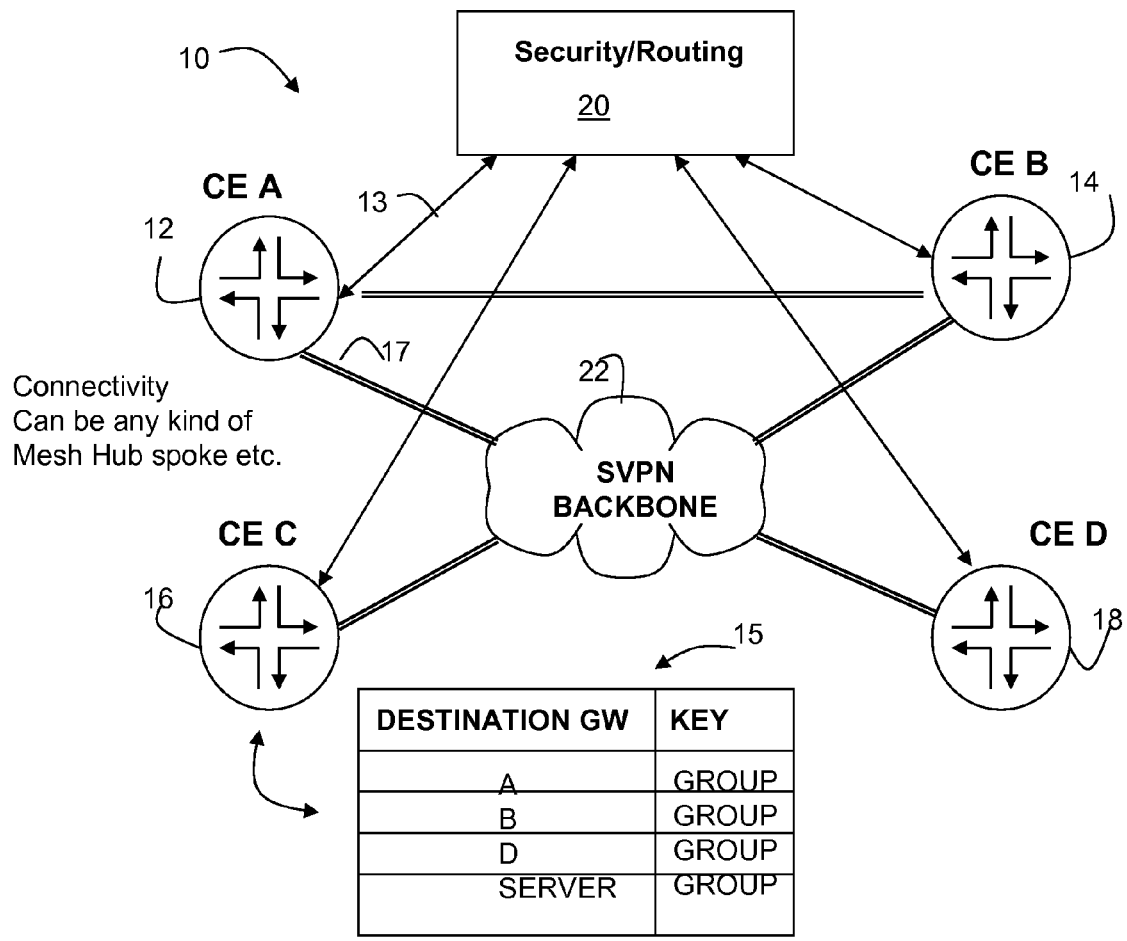
FIG. 1 is a diagram of a prior art secure virtual private network.

FIG. 1 is a diagram of a network 10 which uses group security association processing at edge nodes to provide a Secure Virtual Private Network (SVPN) 22 using the techniques of the '903 and '734 patent applications. Although the network of FIG. 1 is illustrated as having mesh connectivity; it should be understood that the present invention may be used in a network having any type of connectivity, including mesh, hub and spoke, partial mesh, etc. As described in the '903 application, group security associations may be applied at client edge devices 12, 14, 16, 18, at a provider edge (PE) device (not shown) within the network 22, or in a combination thereof to secure private network communications as they traverse the public infrastructure. For simplicity, a Secure VPN (SVPN) backbone 22 is a network which carries private network traffic secured at a CE, PE or combination thereof using group security associations.

Each of the client edge devices 12, 14, 16 and 18 are gateway devices to sites or autonomous systems (not shown) which may include a Local Area Network (LAN) or Wide Area Network (WAN) comprising a plurality of nodes or 'stations'. Each station that is to be a member of a private network (or group) registers with a Security/Routing (S/R) device 20 which includes both a Global Controller/Key Server (GCKS) functionality as well as Routing Functionality. A member may register as part of a group by identifying the group via a group identifier, and identifying other members of the group. For example, a gateway device of an autonomous system may register with the S/R 20 advertising the local area networks that can be reached behind the gateway. Alternatively, a member may register as part of a group by identifying the group, and Routing Functionality of the S/R 20 auto-discovers other members of the group. The GCKS forwards a group security association (GSA) to each identified member of the group.

Group Security Associations (GSAs) are a bundling of SAs that together define how a group communicates securely. The GSA may include, for example, a registration SA, a rekey protocol SA, and one or more data security protocol SAs. A GSA includes all of the attributes identified above with regard to SAs, but also includes several additional attributes. For example GSAs have group policy attributes, such as the kind of signed credential needed for group membership, if group members will be given new keys when a member is added, or whether group members will be given new keys when a member is removed from a group. A GSA may be comprised of multiple SAs, and these SAs may be used for independent purposes. Security Associations (SAs) may identify the type of encryption, authentication, etc. that is applied to communications between group members. Throughout the below description, the term 'key' may be used as a specific example of a security association, although it should be understood that the present invention is not limited to keys.

The GCKS maintains a registration table that includes an entry for each member that is registered with the GCKS, and group IDs for each group with which the member is associated. As members are identified, a route reflector in the S/R logic reflects the routes of all members in the group to all other members in the group. When a node such as device CE C 16 enters the network, a protocol such as the Group Domain Of Interpretation (GDOI) protocol is used by the GCKS to distribute pair-wise keys or other security associations to the node and the route reflector to establish the secure channel 13 between the two. The GDOI protocol is described in IETF RFC 3547, "The Group Domain of Interpretation," June 2003 and incorporated herein by reference. GDOI manages group security associations, which are used by IPSEC and potentially other data security protocols running at the IP or application layers. These security associations protect one or more key-encrypting keys, traffic-encrypting keys, or data shared by group members.

When a group member discovers another member of the group, communications can be exchanged over a data channel such as data channel 17 secured using the group key. Each edge device may include a key table, such as key table 15, which associates group keys with destination gateways.

Figure 2:
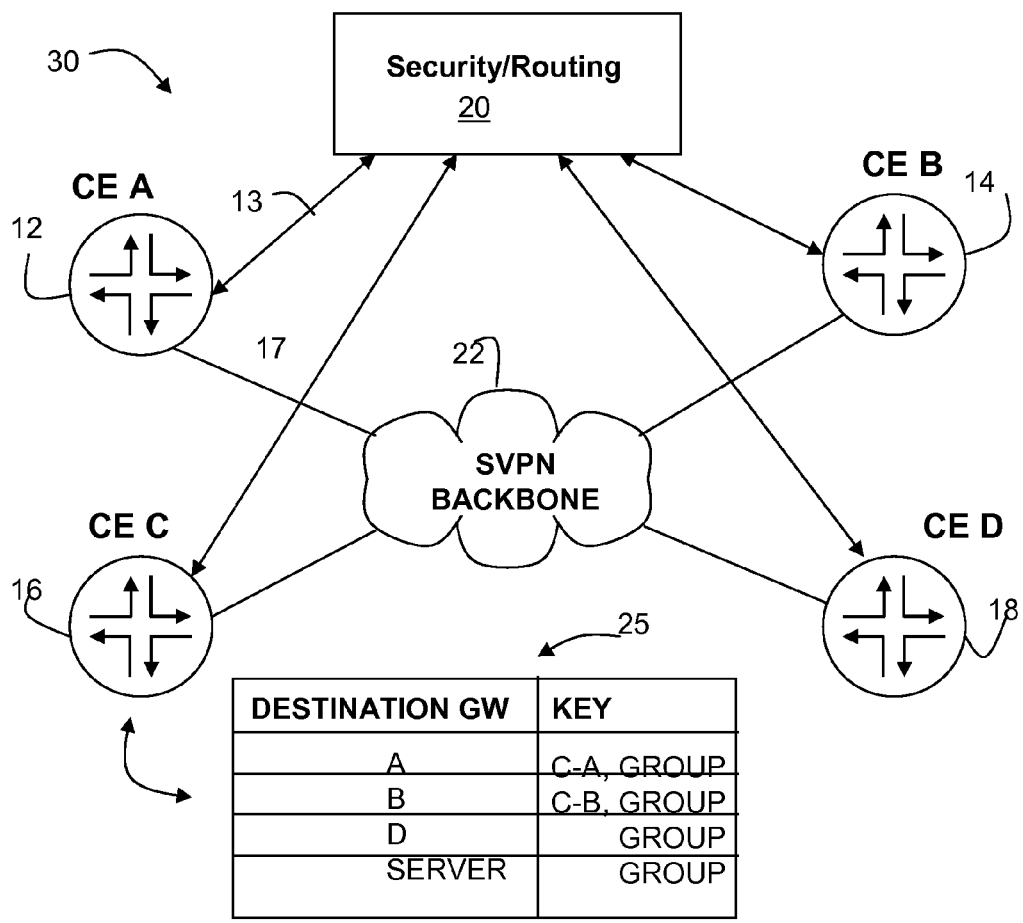
FIG. 2 is a diagram of a secure virtual private network which uses a key selection process of the present invention.

Referring now to FIG. 2, a key table 25 of the present invention is shown to store group keys for certain gateway connections and pair-wise keys for other gateway connections, where the type of key that is used for communication (and thus stored in the key table) at any point in time is selected according to dynamic characteristics of the group connection, including a traffic type, load, quality of service, route etc.

For example, assuming that CE C registers with the GCKS and receives a pair-wise key for establishing a secure control channel with the route reflector, and a group key for communicating with group members on secure data channels over the backbone. When CE A enters the network, it contacts the GCKS and also gets the group key and a unique pair-wise key to establish the secure control channel with the route reflector of the S/R 20. CE A communicates with S/R 20 and learns of CE C. CE C and CE A may now communicate using the group key, as described above. As traffic is introduced and increased between CE C and CE A, either or both of CE C and CE A may request pair-wise keys from the GCKS. The GCKS delivers a unique pair-wise key to both ends of the communication link. In one embodiment, the GCKS does not save the pair-wise key. Upon receiving the keys, CE A and CE C may change the encryption of the data channel to use the pair-wise key in synchronization, similar to typical key rollover. The pair-wise key may have an associated time-out period, and will continue to be used until it needs to be refreshed. Each end node therefore includes the ability to associate either the group key or the pair-wise key with a particular destination. In one embodiment, the pair-wise keys expire, with communication reverting to using the group keys until traffic conditions warrant the renewal of pair-wise keys.

The present invention has an advantage over typical IKE sessions, because it allows communications between devices to begin earlier by leveraging the group key. The delay associated with implementing pair wise keys is therefore minimized, and allows routing and encryption to be decoupled.

Figure 3:
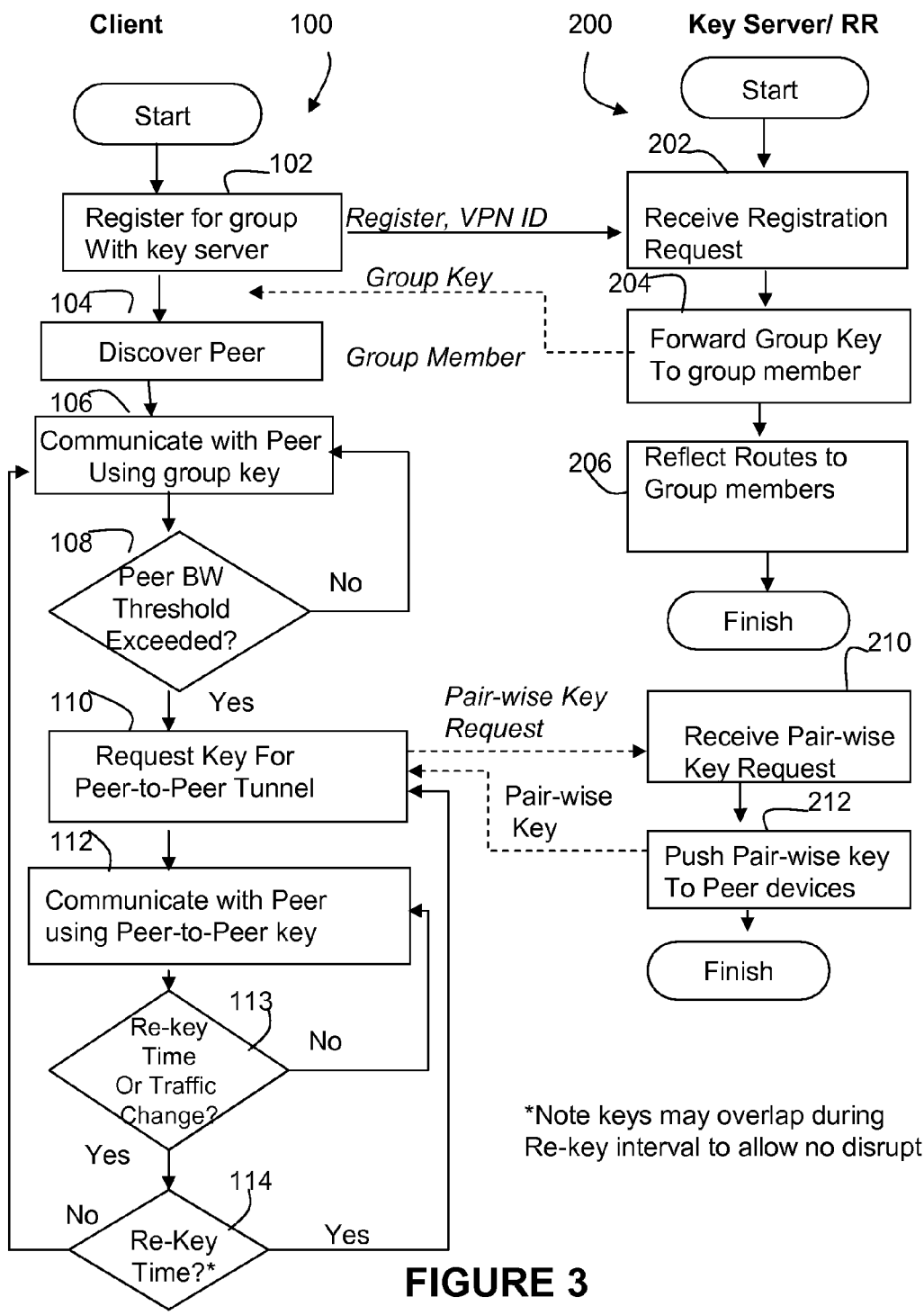
FIG. 3 is a flow diagram illustrating several exemplary exchanges that may occur between a client device and a key server.

FIG. 3 illustrates flow diagram of processes that may be performed by a key server such as the GCKS and a client device, such as a BGP client device, client edge node, provider edge node, etc. At step 102 the client device registers with the key server. The registration may include a group or VPN ID. The key server receives the registration request at step 202 and at step 204 forwards the group key to the client. As mentioned above, the key server may also forward a pair-wise key to the client to enable the client to receive route information from a route reflector for peer discover. On discovering the client, the route reflector may forward any routing information from the client to other group members at step 206.

At step 104, the client discovers a peer, and at step 106 initiates communication with the peer over a secure data channel using the group key provided by the key server at step 204. The client monitors the traffic exchanged in the communication between the end-points. In response to a threshold condition associated with the communication being exceeded, at step 110 the client forwards a request to the key server for a pair-wise key, to allow it to communicate directly with the peer, rather than with the group key. As mentioned above, switching to a private key protects the group key from being used ubiquitously which lowers its cryptographic strength and or requires more rapid re-keying. Because pair wise keys are compute intensive to set up and can substantially delay the distribution of routing information and other operations in a large VPN, the combination of group keys for fast startup and distribution of routing and other broadcast information and the addition of pair-wise keys for substantial peer to peer traffic is the best compromise. The threshold condition may be any one of a variety of conditions, including but not limited to a volume or type of data in the communication, a change in quality of service or security level for the communication, a change in routing of the communication, etc. In addition, embodiments of the invention are envisioned wherein the triggering event is simply a point in the association process between end-nodes. Accordingly, the present invention is not limited to embodiments which require a triggering event that is external to an association process between the end-points.

When the pair-wise key is received at step 112 the client synchronizes the change in encryption to use the new key. As will be described in more detail below, with regards to FIGS. 4 and 5, the new key may be associated with a new route as well. The end-point continue to use the pair-wise key for communications until it is determined at step 113 either that the key expired or that traffic conditions between the end-points have changed so that transition to group keys is appropriate, for example, the end of a video streaming operation has occurred, etc. If it is determined at step 114 that the pair-wise key has expired, but data conditions have not changed, the process returns to step 110, where a new pair-wise key is obtained. In a preferred embodiment, a new pair-wise key (or group wise key) will be obtained prior to the expiration of a current key, with seamless transfer between the new and expired key. If it was determined that the traffic conditions between the end-points has changed to that transition to group keys is appropriate, the process returns to step 106.

Figure 4:
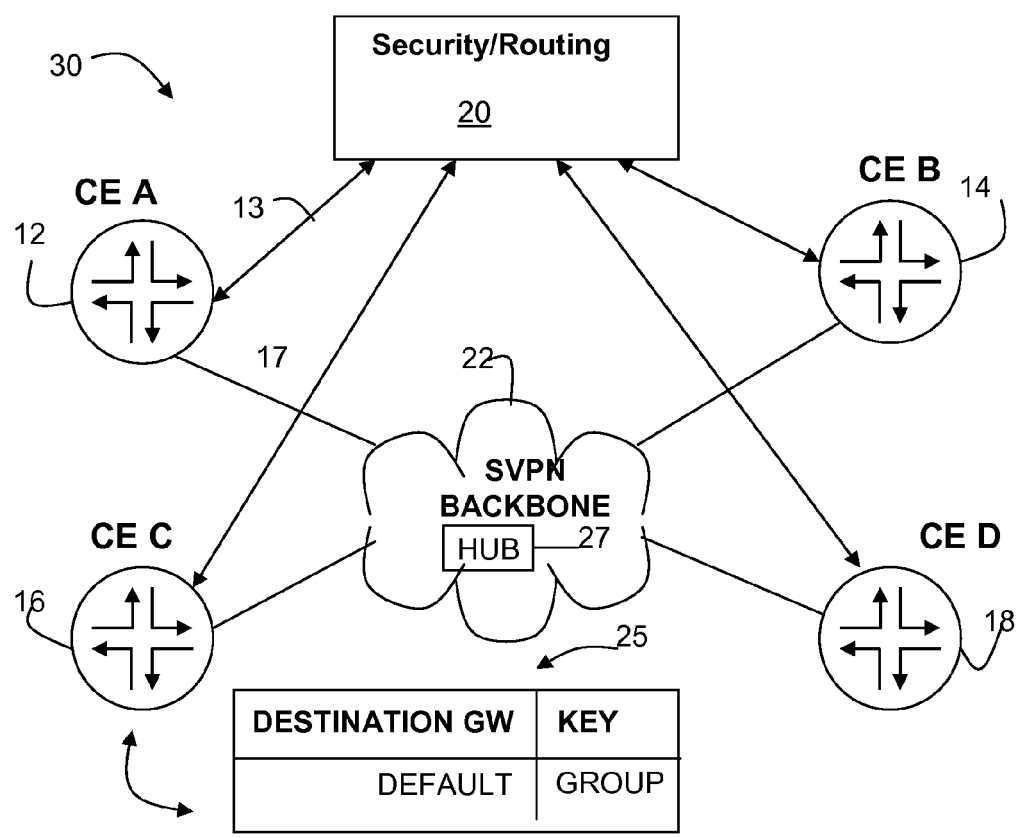
FIGS. 4 and 5 are network diagrams used to illustrate how the key selection process may be used to obtain pair-wise keys while communicating with group members over a hub.
Figure 5:
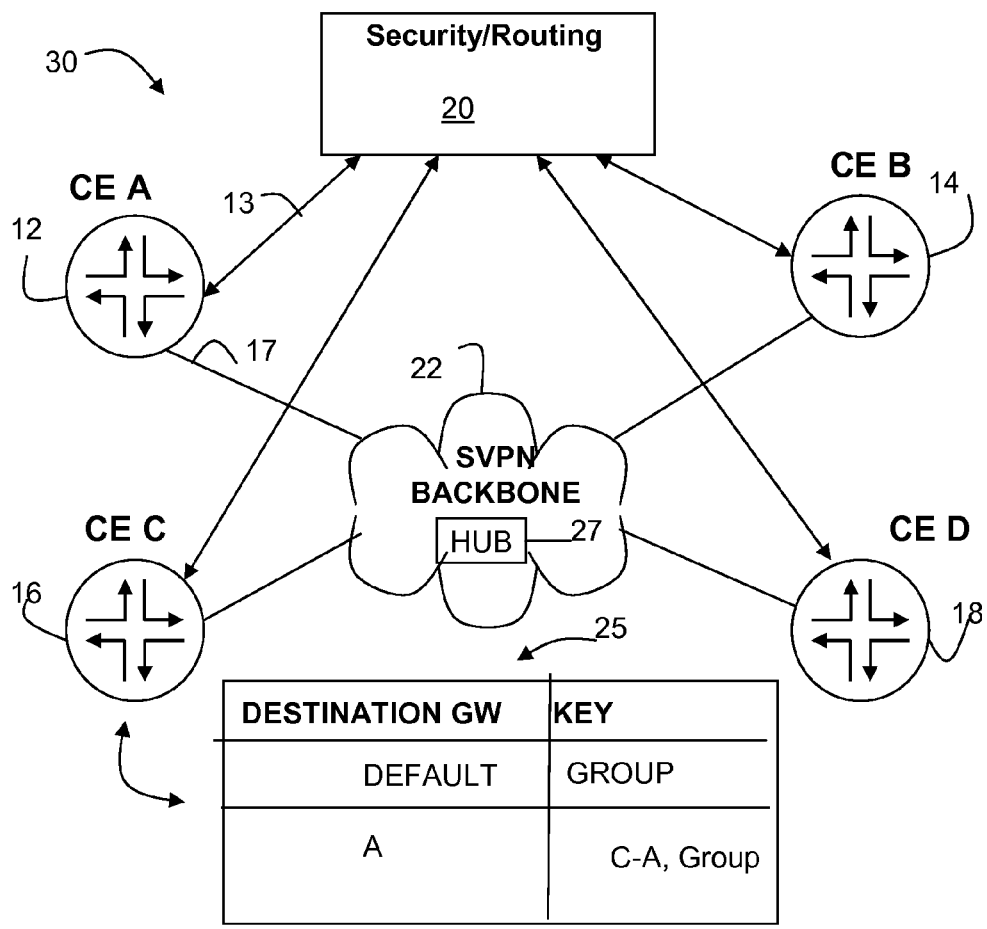

As mentioned above, it may be desirable for the client to transition from the use of a group key to the use of a pair-wise key in response to and in synchronization with a route update between the end-points. For example, in large networks a BGP route reflector may designate a default route for a large HUB. A node as it joins initially gets a group key and a pair-wise key for communications with the route reflector, and learns of the route to the HUB 27. FIG. 4 is a network diagram that illustrates a key table 25 which uses a group key for communicating with a default HUB. The client CE C can communicate with any destination through the HUB with a group key. When traffic through the HUB between two end-points exceeds a threshold, either of the end-points or the HUB device may signal the key server to push pair-wise keys to the end-points. Communications via the HUB continue while the pair-wise keys are established between the end points. FIG. 5 illustrates a key table 25, wherein a communication between end-points CE C and CE A on a channel through the HUB are modified in synchronization with the change in route between the end-points. Thus, no matter how busy the key server or route reflector is, a small amount of information can be provided to each BGP client, to enable it to form a mesh of peers.

Accordingly a key distribution process has been shown and described which secures traffic between VPN end-points using a combination of SVPN group keys and pair-wise keys. The type of key used is based on the dynamic needs of traffic between the end-points, where the needs may include throughput, quality of service and route between the end-points. SVPN group keys allow end-points in a group to initiate data communications while obtaining pair-wise keys in the background. As the throughput, quality of service, routing and other needs of the channel change, the type of keys used for data transfer may concomitantly change between SVPN group keys and pair-wise keys to appropriately utilize network resources.

Having described various embodiments of the invention, it will be appreciated that the present invention may be manifested in many forms. For example, although the invention has been described with regard to generally hub and spoke connectivity in FIGS. 2, 4 and 5, the invention works equally well in a full mesh or other type of network. In addition, although the embodiments have been described as using the Border Gateway Protocol, it is realized that equivalent functionality can be found in one or more other protocols, alone or in combination, and the present invention is not limited to the use of any specific inter-domain routing protocol, but may include BGP, BGP4, Inter Domain Routing Protocol (IDRP) and equivalents.

In addition, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A computer program product, comprising a non-transitory computer usable medium having a computer readable program code embodied therein, said computer readable program code adapted to be executed to implement a method of communicating with a group member comprising the steps of:
   receiving a group key;
   discovering a group member;
   communicating with the group member using the group key over a group channel; and
   responsive to a trigger condition, requesting a pair-wise key for communicating with the group member while communicating with the group member on the group channel; and
   transitioning communications with the group member to a pair-wise channel secured using the pair-wise key.

2. The method of claim 1 wherein the group channel is routed differently from the pair-wise channel.

3. The method of claim 1 wherein the group channel is routed the same as the pair-wise channel.

4. The method of claim 1 wherein the trigger condition is a threshold being exceeded.

5. The method of claim 4 wherein the threshold is a bandwidth threshold.

6. The method of claim 1 wherein the trigger condition is a discovery of a new peer.

7. A network device comprising a non-transitory computer readable medium having program code thereon, the program code being operable when executed to:
   communicate with a group peer using a group key;
   monitor traffic conditions on a group channel between the network device and the group member, the group channel being secured by the group key to detect a trigger condition;
   request a pair-wise key for communicating with the group member; and
   transition communications with the group member from the group channel to a pair-wise channel secured by the pair-wise key.

8. The network device of claim 7 wherein the program code is further operable to transition communications with the group member from the pair-wise key to the group key in response to a change of the communications.

* * * * *